United States Patent
Romatka et al.

(10) Patent No.: US 9,535,936 B2
(45) Date of Patent: Jan. 3, 2017

(54) CORRELATION OF MAXIMUM CONFIGURATION DATA SETS

(71) Applicant: The Boeing Company, Chicago, IL (US)

(72) Inventors: Rainer Johannes Romatka, Bellevue, WA (US); Charles Mark Williams, Kirkland, WA (US); Steve X. Chang, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 285 days.

(21) Appl. No.: 14/018,587

(22) Filed: Sep. 5, 2013

(65) Prior Publication Data

US 2015/0066870 A1   Mar. 5, 2015

(51) Int. Cl.
*G06F 7/00* (2006.01)
*G06F 17/30* (2006.01)

(52) U.S. Cl.
CPC ... *G06F 17/30306* (2013.01); *G06F 17/30286* (2013.01); *G06F 17/30303* (2013.01); *G06F 17/30371* (2013.01); *G06F 17/30442* (2013.01)

(58) Field of Classification Search
CPC .................... G06F 17/30303; G06F 17/30371
USPC ........................................................ 707/690
See application file for complete search history.

(56) References Cited

U.S. PATENT DOCUMENTS

| | | | | |
|---|---|---|---|---|
| 4,945,488 A * | 7/1990 | Carver | ................ | B29C 67/0074 700/182 |
| 5,033,014 A * | 7/1991 | Carver | ................ | B29C 67/0074 700/182 |
| 8,078,489 B1 * | 12/2011 | Marsten | ................ | G06Q 10/04 705/7.25 |
| 8,311,863 B1 * | 11/2012 | Kemp | ................ | G06Q 10/0639 705/7.11 |
| 8,781,882 B1 * | 7/2014 | Arboletti | ............ | G06Q 10/0639 705/7.11 |
| 9,245,241 B2 * | 1/2016 | Kite | ........................ | G06Q 10/06 |
| 2002/0078403 A1 * | 6/2002 | Gullo | .................... | G06F 11/008 714/37 |
| 2008/0288889 A1 * | 11/2008 | Hunt | ...................... | G06Q 30/02 715/810 |

(Continued)

OTHER PUBLICATIONS

Extended European Search Report, dated Jan. 30, 2015, regarding Application No. EP14183321.0, 6 pages.

(Continued)

*Primary Examiner* — Mark E Hershley
(74) *Attorney, Agent, or Firm* — Yee & Associates, P.C.

(57) ABSTRACT

A method of correlating data for multiple product configurations is provided comprising enhancing, by a processor, data set definition to accommodate data models of data sets describing multiple product configurations. The method also comprises comparing, by the processor, values of the data sets utilizing at least one matching algorithm and effectivity expressions identifying relevant rows for comparison in the data sets. The method also comprises enhancing, by the processor, the at least one matching algorithm to identify perfect and partial matches between the data sets wherein values of all data contained in the data sets are compared in one single operation comprising simultaneous validation of engineering data for the multiple product configurations.

20 Claims, 5 Drawing Sheets

(56) References Cited

U.S. PATENT DOCUMENTS

| | | | | |
|---|---|---|---|---|
| 2009/0018996 A1* | 1/2009 | Hunt | ............ | G06Q 30/02 |
| 2010/0179837 A1* | 7/2010 | Artinger | ............ | G06Q 40/08 |
| | | | | 705/4 |
| 2010/0185475 A1* | 7/2010 | Holle | ............ | G06Q 10/04 |
| | | | | 705/7.23 |
| 2011/0213700 A1* | 9/2011 | Sant'Anselmo | ....... | G06Q 10/10 |
| | | | | 705/39 |
| 2012/0191967 A1* | 7/2012 | Lin | ............ | G06F 17/16 |
| | | | | 713/100 |
| 2013/0060807 A1 | 3/2013 | Rambhia et al. | | |
| 2013/0204875 A1* | 8/2013 | Pielok | ............ | G06F 17/30705 |
| | | | | 707/737 |
| 2014/0157194 A1* | 6/2014 | Callahan | ............ | G06F 17/30292 |
| | | | | 715/810 |
| 2015/0033216 A1* | 1/2015 | Appadurai | ............ | G06F 8/68 |
| | | | | 717/169 |

OTHER PUBLICATIONS

Li et al., "New multi-layer data correlation algorithm for multi-passive-sensor location system," Chinese Journal of Systems Engineering and Electronics, vol. 18, No. 4, Dec. 2007, pp. 667-672.

Koike, "Performance analysis of signed correlation algorithm with recursive estimateion of signed datat covariance for fast convergent and robust adaptive filters," 2011 IEEE Statistical Signal Processing Workshop, Jun. 2011, pp. 625-628.

Canadian Office Action mailed Nov. 13, 2015, regarding application No. 2855354, 4 pages.

* cited by examiner

CORRELATION OF MAXIMUM CONFIGURATION DATA SETS

BACKGROUND INFORMATION

1. Field

The present disclosure relates generally to comparison of data sets describing manufactured products, and more particularly, to the comparison of multiple data sets of unlike structure including maximum configuration data sets containing all configuration data for a product subject to comparisons.

2. Background

Manufacturers of complex products, for example commercial jet aircraft, may maintain multiple and varied data stores containing information about the products. Detailed records may be stored before, during, and after manufacture and sale of an aircraft. The data stores may contain detailed engineering information including product specifications, design diagrams, assembly and parts descriptions, software information, change order information, maintenance data, and compliance documentation. Extensive engineering and other product information may be used in manufacturing operations as well as to support post-sale tracking of changes to aircraft in customer use. Manufacturers may be required to maintain accurate data about their products under contractual relationships with their customers and others and to comply with regulatory requirements.

Such manufacturers may maintain a plurality of internal data stores containing product information. Marketing, product design, engineering, manufacturing, field support, and executive functions may store and access product information from separate data stores. Some products may be manufactured from many thousands or more of component hardware parts as well as software programs and modules. Manufacturers face challenges in maintaining consistency within and across various data stores used by internal functions. Conflicts between internal product data store records may result in errors in manufacturing, causing delays and increasing manufacturing cost. Post-sale data conflicts may cause customer relationship problems and result in liability under warranty and maintenance commitments.

While a manufacturer of complex products may operate various internal data stores and face challenges associated with assuring consistency and accuracy across internal data stores, parties outside the manufacturer may also maintain similar data stores of the manufacturer's product information. Customers, partners, suppliers, subcontractors, regulators, and distributors of the manufacturer as well as post-sale service providers and regulatory bodies operate data stores containing the product information to support their own business and other operations. In addition to facing challenges presented by multiple internal data stores, the manufacturer may be interested in maintaining consistency between its internal data stores and those of outside parties. Further, the manufacturer seeks consistency between data stores of outside parties, for example between data stores of customers and those of service providers, such as maintenance firms. Such consistency between records of outside parties may support the manufacturer's warranty enforcement and post-sale parts and services revenue efforts. Long after a sale has been completed, the manufacturer may have a stake in consistency of information across its constituent customer, supplier, partner, and other relationships.

Challenges associated with data store consistency may arise from different data structures used by data stores maintained by groups internal to the manufacturer. External parties may also use different data structures and use different data naming conventions. In addition, both internal and external groups may not maintain current information in their data stores or may have differing version control practices.

To address risks and challenges of data stores not matching, a producer of complex manufactured products may use software programs that compare records in data stores and identify discrepancies between records. However, a manufacturer seeking accurate comparisons may be subject to limitations. The manufacturer may discover that data models of the data sets under comparison are different. Differences in data models may cause comparison results to be incorrect, misleading, and difficult to interpret. Further, methods of comparison may be limited in capability such that comparisons may be possible only between like units of the same product model. Comparisons of unlike models of a product may not be possible or be so limited in scope as to have minimal value. In addition, methods may be inflexible and not facilitate comparisons of groups of units, particularly groups of unlike or dissimilar models of product. Unit to unit comparisons may be the only comparisons that produce results of value, but such one-to-one comparisons are costly and time consuming when many units are involved.

Therefore, it would be advantageous to have a method and apparatus that takes into account one or more of the issues discussed above, as well as possibly other issues.

SUMMARY

The illustrative embodiments provide a method of correlating data for multiple product configurations comprising enhancing, by a processor, data set definition to accommodate data models of data sets describing multiple product configurations. The method also comprises comparing, by the processor, values of the data sets utilizing at least one matching algorithm and effectivity expressions identifying relevant rows for comparison in the data sets. The method also comprises enhancing, by the processor, the at least one matching algorithm to identify perfect and partial matches between the data sets wherein values of all data contained in the data sets are compared in one single operation comprising simultaneous validation of engineering data for the multiple product configurations.

The illustrative embodiments also provide a system for correlating data for multiple product configurations. The system comprises a processor, a memory connected to the processor, the memory storing program code which, when executed by the processor, performs a computer-implemented method. The program code comprises program code for performing, using the processor, broadening data set definitions to accommodate data models of data sets describing multiple product configurations, the broadened data set definition comprising a maximum configuration. The program code also comprises program code for performing, using the processor, comparing values of the data sets with the maximum configuration utilizing at least one matching algorithm and effectivity expressions identifying relevant rows for comparison in the data sets. The program code also comprises program code for performing, using the processor, enhancing the at least one matching algorithm to identify perfect and partial matches between the data sets and between the data sets and the maximum configuration.

The illustrative embodiments also provide a method of correlation of configuration data sets, comprising accessing, by a processor, a first data repository describing a first component data set for at least a first configuration of a first product. The method also comprises accessing, by the processor, a second data repository describing a second component data set for at least the first configuration of the first product. The method also comprises applying, by the processor, a matching algorithm to the first component data set and the second component data set to evaluate effectivity expressions identifying relevant rows for comparison in the data sets and to compare components in the data sets. The method also comprises determining, by the processor, at least one rating of at least one of the first component data set and the second component data set based on the results of applying the matching algorithm.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account the issues described above. Thus, the illustrative embodiments provide methods and systems that compare and correlate data for multiple product configurations. A manufacturer of commercial aircraft or other products may wish to compare various databases and other data sets that it maintains internally in support of operations. Before a complex product, such as an aircraft, begins to be built, the manufacturer may seek assurance that conflicts do not exist between component data stores of any functions involved with the product.

Thus the illustrative embodiments recognize that data sets of unlike structures and sizes may need to be compared. The illustrative embodiments effectively overcome structural differences between data models of data sets undergoing comparison. Thus, the illustrative embodiments promote comparisons of stores of data based on different data models and may promote resolution of conflicts and avoidance of costly mistakes during and after production. Data sets based on differing data models may be compared with meaningful results drawn from the comparisons despite the data sets' structural differences. For example, two data sets may contain the identical item of information, for example a subassembly specification, but in different formats. The illustrative embodiments provide for the differences in formats to be overcome such that a user may find assurance that the items of information are not in conflict. Conversely, bridging unlike data formats may promote discovery that two subassembly specifications previously thought to be identical are in fact not identical, leading to a timely implementation of a resolution.

Data set definitions are enhanced and broadened by methods described herein to accommodate differences between data models by providing additional features to the data models. Additional descriptors of data objects may be imported. At least one matching algorithm provided herein compares rows of unlike data sets and identifies discrepancies. The algorithm may make comparisons by relying on effectivity expressions embedded within the data sets. Effectivity expressions contain markers associated with characteristics of a subject aircraft, for example, that assist in identifying which rows within each subject data set are relevant to the comparison. Boolean logic is applied to the effectivity expressions in making the determinations of relevant rows. Because data sets subject to comparison may differ in size, quantity, and structure from each other, the illustrative embodiments enhance the algorithms to promote identification of perfect matches between rows and data therein as well as promote identification of partial matches.

The illustrative embodiments provide for comparisons involving maximum configuration data sets that define all possible configurations in a particular product line. One or more configurations of units of a product may be compared with a maximum configuration data set of the product for various purposes. In an aircraft manufacturing example, a configuration for a single unit, or tail number, of an aircraft may be about to commence manufacturing. Note that the term "tail number" is not limited to a number associated with a tail of an aircraft or other vehicle, but rather as stated refers to a configuration for a single unit.

So as to avoid costly errors once the unit begins manufacturing, the manufacturer may wish to compare data sets for the tail number presently stored in databases for manufacturing, product design, and engineering functions with a maximum configuration data set for the product. The comparison may promote the manufacturer to discover discrepancies or errors within data sets or between data sets. The comparison may also be used to verify data generated by contractors or partners. The discrepancies may lead to discovery of actual errors that may be corrected relatively at the start of manufacturing of the particular unit or tail number as opposed to once manufacturing has begun.

Discovery of discrepancies and tracing of their sources may lead to a larger discussion that uncovers other areas of discussion associated with the tail number soon to undergo manufacturing. Other matters for discussion with the product line on a broader scale or process or communication problems between and within internal groups may be uncovered. Disagreements between internal functions such as engineering and manufacturing, for example, may come to the surface which merit changes that would be expensive to resolve once the tail number began manufacturing. The illustrative embodiments further provide for comparisons of unlike quantities of rows between data sets and for determining relevance of certain rows during data set comparison. Discovery of discrepancies and tracing of their sources may present opportunities for improvement in process, sequence, or testing.

The illustrative embodiments provide for various ratings to be made based on comparisons of data sets of individual or groups of units of products with each other and with a maximum configuration data set. Ratings may provide a measure of how closely two or more data sets or rows within data sets conform to each other based on comparisons, including comparisons with a maximum configuration data set. The ratings may include confidence ratings that express levels of confidence associated with the matching rating provided.

The illustrative embodiments may provide value in enabling tracing of different design representations of a unit of a product from the early phases of customer and engineering requirements, to logical representation of the unit, to computer-aided design models, and finally on to manufacturing and even post-sale stages. The manufacturer may seek assurance that data in one representation is matched by data in other representation and that differences are traceable and are fully resolved or otherwise accounted for. While structural and data model differences may exist across data sets associated with each stage, the illustrative embodiments provide such differences to be overcome and may promote meaningful results to be drawn from such data set comparisons.

The ability to compare and correlate engineering data for multiple configurations of an aircraft may reduce manual labor and may make it practical to validate a large number of aircraft configurations. Including additional functionality about data row relevance or effectivities in algorithms provided herein may enhance accuracy of the algorithms and further reduce manual correction of automated results.

Figure 1:
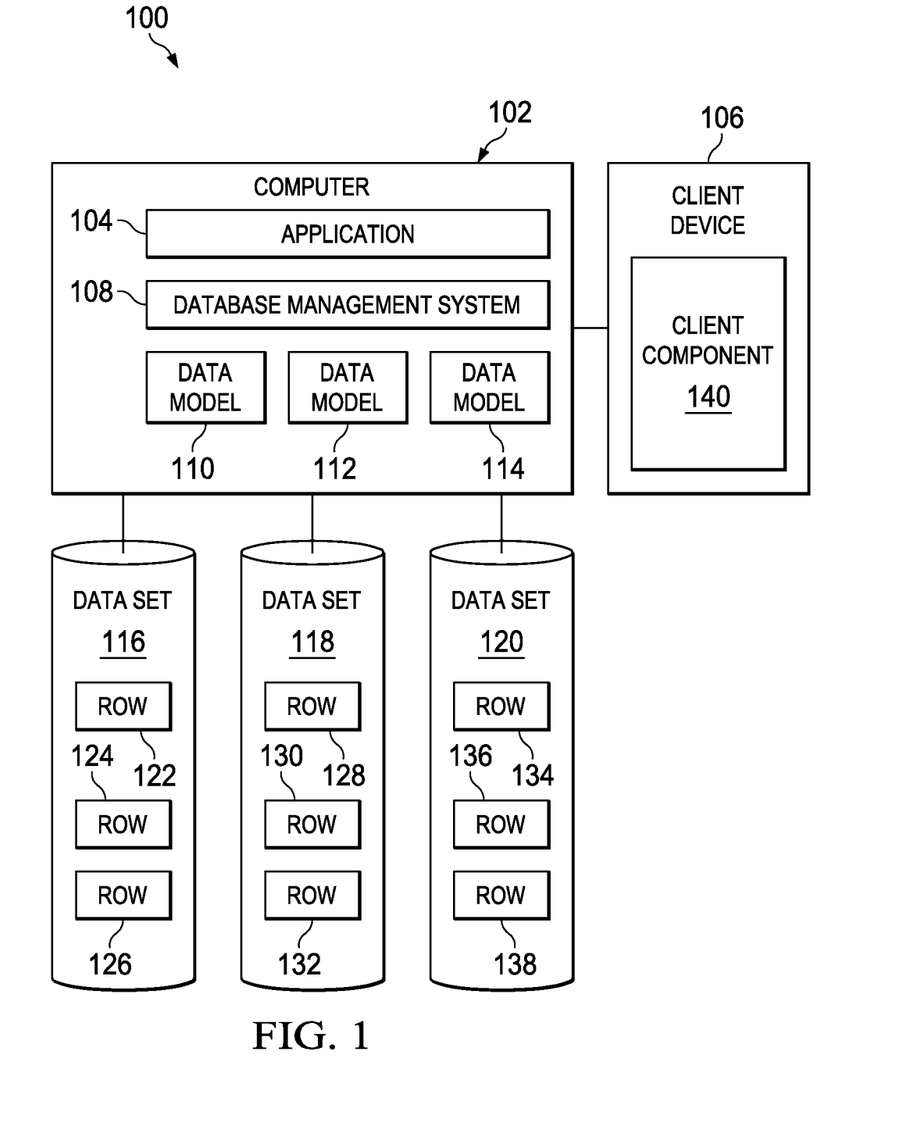
FIG. 1 is a block diagram of a system of correlation of maximum configuration data sets in accordance with an illustrative embodiment.

Attention is turned to the figures. FIG. 1 is a block diagram of a system of correlation of maximum configuration data sets in accordance with an illustrative embodiment.

System 100 includes computer 102. Computer 102 may be a general purpose computer. General purpose computers are described with respect to FIG. 5. Application 104 may execute on computer 102. Application 104 includes at least one algorithm that enhances and broadens definitions of data sets to enable comparison of data sets based on different data models.

System 100 includes client device 106 from which a user may access application 104. In an embodiment, client portions of application 104 may be stored and execute on client device 106. The user may enter requests from client device 106 for comparisons of various data sets as provided herein.

System 100 includes database management system 108 which is an application that interacts with application 104, client device 106, other applications, and data stores or databases to capture and analyze data. Database management system 108 is a software system designed to allow the definition, creation, querying, update, and administration of data stores or databases. While database management system 108 is depicted in FIG. 1 as executing on computer 102, in embodiments database management system 108 may not execute on computer 102 and may instead execute on another device.

System 100 includes data model 110, data model 112, and data model 114 that describe the logical structures of databases and other types of data sets and determine the manner in which data can be stored, organized, and manipulated in data sets. While data model 110, data model 112, and data model 114 are depicted in FIG. 1 as components separate from database management system 108 executing on computer 102, in an embodiment data model 110, data model 112, and data model 114 may be components of database management system 108. In an embodiment, data model 110, data model 112, and data model 114 are stored on a device other than computer 102.

System 100 includes data set 116, data set 118, and data set 120 that may store data about products sold by a manufacturer that may use system 100 in its operations. While data set 116, data set 118, and data set 120 are depicted in FIG. 1 as separate databases, in an embodiment data set 116, data set 118, and data set 120 may not be separate databases and may instead be separate collections of records in a single database. In an embodiment, data set 116, data set 118, and data set 120 may not be associated with databases and may be stored using different methods. In an embodiment, data model 110 corresponds to data set 116, data model 112 corresponds to data set 118, and data model 114 corresponds to data set 120.

System 100 includes multiple rows that are components of one of data set 116, data set 118, and data set 120. System 100 includes row 122, row 124, and row 126 that are components of data set 116. System 100 includes row 128, row 130, and row 132 that are components of data set 118. System 100 includes row 134, row 136, and row 138 that are components of data set 120.

A manufacturer of complex products such a commercial jet aircraft may maintain data set 116, data set 118, and data set 120 about a particular product, for example one or more units of a model of an aircraft. A single unit may be referred to as a "tail number." Data set 116 may be maintained by a product design function of the manufacturer. Data set 118 may be maintained by an engineering function. Data set 120 may be maintained by a manufacturing function. In theory, all three of data set 116, data set 118, and data set 120 should be identical in terms of configurations. However, as a unit or tail number moves through the process of initial design to drawing up of engineering specifications and on to manufacturing, data set 116, data set 118, and data set 120 in the control of product design, engineering, and manufacturing functions, respectively, may become inconsistent with each other.

A commercial jet aircraft is typically built from many thousands of components and subassemblies. The entire process from initial conception to the finished aircraft being delivered to the customer may take many months. Further, product design, engineering, and manufacturing are large and complex functions involving thousands of persons and multiple levels of management. For these and other reasons, discrepancies between data set 116, data set 118, and data set 120 may occur.

Application 104 may overcome differences between data model 110 and data model 112, for instance, by broadening or enhancing a definition of at least one data set 116, data set 118, and data set 120 such that their respective data model 110, data model 112, and data model 114 can be accommodated and their data contents compared with meaningful results potentially generated. Such enhancement may involve providing additional features to data model 110 and data model 112. Application 104 may import additional descriptors of data objects in data model 110 and data model 112.

Application 104 then applies the at least one matching algorithm to the data set 116, data set 118, and data set 120 being compared to determine any differences. Differences found may be accounted for and acceptable. Alternatively, differences may indicate errors or other problems in the contents of one of data set 116, data set 118, and data set 120.

In an embodiment, application 104 does not compare entire data set 116, data set 118, and data set 120 with each other. Application 104 may instead compare only portions, for example portions of data set 116 with portions of data set 118. Instead of all of row 122, row 124, and row 126 of data set 116 being compared with all of row 128, row 130, and row 132 of data set 118, only specifically identified rows of one or more data sets are compared and correlated with specifically identified rows of one or more other data sets.

Bodies of data that are subject to comparison may contain embedded effectivity expressions about items within the data set 116, data set 118, and data set 120, for example rows or other groupings of data that are relevant to a comparison. Effectivity expressions are statements that may be evaluated by Boolean logic. Effectivity expressions contain markers for individual attributes or factors for a single tail number or a range of aircraft tail numbers. Effectivity expressions may, for example, be created for an individual tail number and may be associated with an individual row 122 in data set 116 for the particular tail number. A marker in an effectivity expression may, for example, indicate that it is true that a first brand of jet engine is installed on a specific tail number or range of tail numbers. A marker may similarly indicate that it is false that a second brand of jet engine is installed on the specific tail number or range of tail numbers. Markers in effectivity expressions specify the presence or absence of a characteristic or attribute of a particular tail number or range of tail numbers. Effectivity expressions indicate which features for which tail numbers are present or not present. Boolean logic applied to markers contained within effectivity expressions determines whether true or false as to the characteristic or attribute being associated with the tail number, for example the presence or absence of a particular type or brand of jet engine.

Evaluation of various effectivity expressions may assist in determining which rows are relevant to a comparison. Evaluation of an effectivity expression may, for example, indicate that row 122 and row 124 but not row 126 of data set 116 are relevant to a comparison with row 134 and row 136 but not row 138 of data set 120. Evaluation of another effectivity expression may indicate that only row 130 of data set 118 is relevant to a comparison with all of 134, row 136, and row 138 of data set 120. Application 104 reads, evaluates, or interprets effectivity expressions in data. Application 104 uses Boolean logic to evaluate effectivity expressions to support comparisons of data set 116, data set 118, and data set 120. Based on evaluations of effectivity expressions read from data, application 104 makes determinations on how to select and correlate data in various row 122, row 124, row 126, row 128, row 130, row 132, row 134, row 136, and row 138 of data set 116, data set 118, and data set 120, respectively.

In an embodiment, any or all of data set 116, data set 118, and data set 120 may be a maximum configuration data set that contains all configuration data about a product, for example a particular model of an aircraft. Data set 116 may contain selected data for a particular unit or tail number or group thereof. Data set 118 may be a maximum configuration data set containing all configuration data about the model of aircraft of which the tail number is an instance. The manufacturer of the tail number may wish to compare data set 116 with the maximum configuration data set of data set 118 prior to beginning manufacturing of the particular tail number associated with data set 116. The manufacturer may seek assurance that the configuration of the tail number conforms to the general specification of the aircraft model of which the tail number is an instance. In the example, performing such a comparison and resolving discrepancies prior to the start of manufacturing may save the manufacturer time and money in the long run.

The illustrative embodiments allow groups of product configurations to be compared to a maximum configuration data set. For example, data set 116 and data set 118 may each describe one or more separate tail numbers of an aircraft model and data set 120 may be a maximum configuration data set containing all configuration information for possible tail numbers of the model of the aircraft. Application 104, supported by effectivity expressions located in the data, may perform a series of correlations to uncover inconsistencies or errors in the configurations of the individual tail numbers. Previously, only unit to unit comparisons may have been possible.

An aircraft manufacturer may want to compare two groups of tail numbers purely on the basis of their having specific assemblies or parts installed or to be installed during manufacturing. A particular tail number or group of tail numbers may have had problems during virtual testing prior to being manufactured and modifications may have been made. The manufacturer may use application 104 to gain assurance that the subject modified tail numbers are not in conflict with the maximum configuration of the model. An aircraft manufacturer may seek to compare aircraft sold and in currently possession of airlines with aircraft of the same or different model that have not yet been manufactured. A maintenance service provider or aircraft leasing company may be interested in changes made to certain aircraft by their owners while in service. A regulatory body interested in certification of a fleet of aircraft changing ownership may similarly seek assurance that the aircraft are in compliance with regulations. Application 104 makes possible a number of combinations of comparisons and allows isolation of components of interest and comparisons based thereon.

In a case wherein two or more maximum configuration data sets are compared to one another, an aircraft manufacturer, airline, government regulatory body, insurance company, or other entity may wish to compare data set 116 containing all configuration data for a first aircraft model with data set 118 containing all configuration data for a second aircraft model. The two models may have similarities in hardware, software, maintenance practices, or post sale events that cause comparisons of the two models to be of value. Effectivity expressions embedded into the two or more maximum configuration data sets of data set 116 and data set 118 in this example may support decisions about which rows or groups of rows to use in comparisons.

In an embodiment, application 104 may promote ratings of correlations or comparisons that are expressions about the quality or validity of comparisons. Other types of ratings are promoted by application 104 including confidence ratings in support of the ratings of comparisons. Ratings may be expressed as percentages.

The illustrative embodiments may promote extension of some existing systems that allow only unit to unit comparisons of aircraft or other complex manufactured products. By allowing comparisons of many tail numbers with many other tail numbers, including groups of like and unlike tail numbers compared with each other and compared with maximum configuration data sets, patterns may become discernable that would not be seen when simple unit to unit comparisons are done. Patterns discerned from large quantities of data may promote decisions that have a more wide ranging effect on an aircraft manufacturer's business, for example.

Data set 116, data set 118, and data set 120 may be built from many kinds of databases and other data storage methods. Data set 116, data set 118, and data set 120 may be product data management (PDM) systems that may be components of product lifecycle management (PLM) systems. Product data management systems track and control data related to particular products, such as models of commercial aircraft. Data tracked may involve technical specifications of an aircraft model, specifications for manufacture and development, and the types of materials that will be required to produce the finished aircraft. The use of product data management systems may allow an aircraft manufacturer, for example, to track the various costs associated with the creation and launch of a model of aircraft. With product data management, the manufacturer's attention may be directed to managing and tracking the creation, change and archive of data related to an aircraft model. The product data management system may serve as a central knowledge repository for process and product history, and may promote integration and data exchange among internal users who interact with the aircraft model, including project managers, engineers, marketing and sales functions, procurement, and quality assurance teams. In an embodiment, the manufacturer may permit some outside parties such as contractors, suppliers, distributors, and other partners to have limited access to the manufacturer's product data management systems. In an embodiment, data set 116, data set 118, and data set 120 contain data beyond product data, for example results or output from an analysis of function, behavior or performance.

Data set 116, data set 118, and data set 120 may be built using commercially available data storage products. Such products or implementations may include or be used in conjunction with at least one of CATIA®, DELMIA®, and ENOVIA®, all products of Dassault Systèmes S.A. Such products or implementations may also include MAPPER®, a database management and processing system of Boeing Corporation. Other products or implementations are available on a commercial or other basis to build at least one of data set 116, data set 118, and data set 120. Application 104 enhances and broadens data set definition to allow comparisons between data set 116, data set 118, and data set 120 created using various implementations of product data management systems, including the specific commercial implementations described above. Data set 116, data set 118, and data set 120 may be based on different respective data model 110, data model 112, and data model 114. Application 104 promotes comparisons of data set 116, data set 118, and data set 120 despite their having different structures.

For example, an aircraft manufacturer may use one of the commercially available products described above to build data set 116. An outside subcontractor or supplier of the manufacturer may use a different product data management or other implementation to construct data set 118. The manufacturer may seek assurance that there are no or minimal conflicts between the manufacturer's engineering specifications and those of the subcontractor or supplier before commencing manufacture of a tail number or group of tail numbers incorporating the outside party's components. The manufacturer may use application 104 to compare data set 116 with data set 118 to gain the desired assurance. Client component 140 may be client software. For example, client component 140 may execute on client device 106 and may correspond to such client software executing on a client, such as 306 of FIG. 3.

Figure 2:
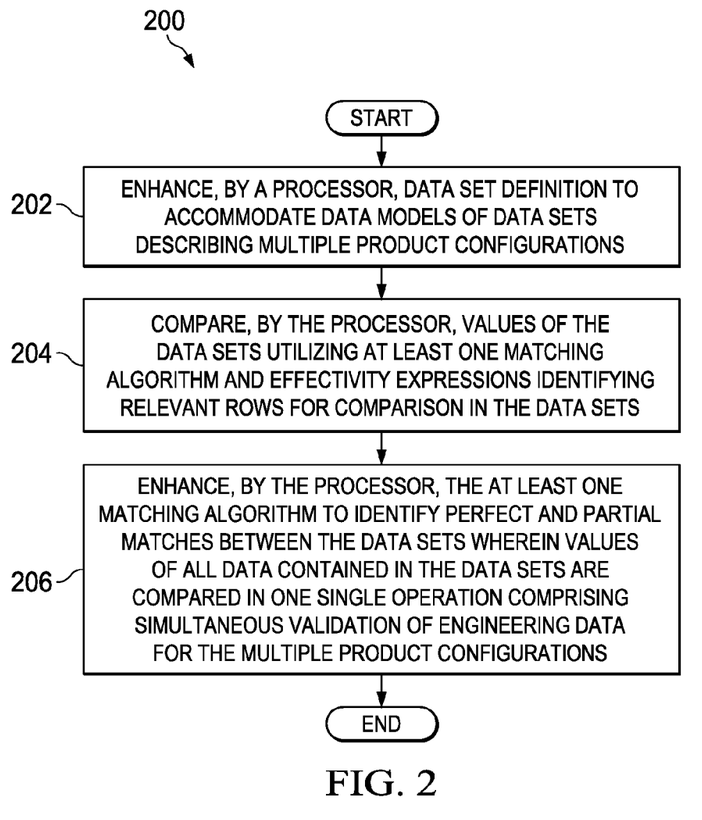
FIG. 2 is a flowchart of a method of correlation of maximum configuration data sets in accordance with an illustrative embodiment.

FIG. 2 is a flowchart of a method of correlation of maximum configuration data sets in accordance with an illustrative embodiment. Method 200 shown in FIG. 2 may be implemented using system 100 of FIG. 1. The process shown in FIG. 2 may be implemented by a processor, such as processor unit 504 of FIG. 5. The process shown in FIG. 2 may be a variation of the techniques described in FIG. 1 and FIG. 3 through FIG. 5. Although the operations presented in FIG. 2 are described as being performed by a "process," the operations are being performed by at least one tangible processor or using one or more physical devices, as described elsewhere herein. The term "process" also may include computer instructions stored on a non-transitory computer readable storage medium.

Method 200 may begin as the process may enhance, by a processor, data set definition to accommodate data models of data sets describing multiple product configurations (operation 202). Next, the process may compare, by the processor, values of the data sets utilizing at least one matching algorithm and effectivity expressions identifying relevant rows for comparison in the data sets (operation 204). Next, the process may enhance, by the processor, the at least one matching algorithm to identify perfect and partial matches between the data sets wherein values of all data contained in the data sets are compared in one single operation comprising simultaneous validation of engineering data for the multiple product configurations (operation 206). Method 200 may terminate thereafter.

Enhancing definitions of data set 116, data set 118, and data set 120 to accommodate data models of such data set 116, data set 118, and data set 120 may include providing further features to data model 110, data model 112, and data model 114. Adding more features to data model 110, data model 112, and data model 114 may promote more effective and useful comparisons of models of aircraft that are dissimilar, for example. Such enhancement or broadening of definitions of data set 116, data set 118, and data set 120 may be accomplished by importing additional descriptors of data objects.

Enhancing the matching algorithm to identify perfect and partial matches between data set 116, data set 118, and data set 120 may include enabling various matching of different data representations. Enhancing the matching algorithm may be accomplished by adding functionality that facilitates comparisons of data set 116, data set 118, and data set 120 exhibiting dissimilar structures.

Use of systems and methods provided herein to compare data set 116, data set 118, and data set 120 of dissimilar structure and size may yield beneficial technical effects. For example, the illustrative embodiments may provide an increased rate of handling and production of output of comparisons of aircraft models. Such increased rate supports expedited manufacturing of aircraft with minor differences between them wherein the minor differences are isolated and manufacturing errors that may have otherwise occurred are consequently circumvented. Because differences between data set 116, data set 118, and data set 120 are isolated and compared more quickly, manufacturing may begin sooner with a reduced likelihood of errors occurring during manufacturing.

Further, some data may be reused repeatedly because generating fully new data set 116, data set 118, and data set 120 may not be required. More precise differences in data may be isolated, thus promoting more granular and exacting comparisons leading to greater accuracy and quality of results. Beneficial technical effects also include maintenance in the order of precedence of data items during data comparisons such that more authoritative data is provided precedence in comparisons. Reduced cost in management of data may result from this technical effect. Maintaining precedence of authoritative data may boost accuracy and productivity by reducing a need to regenerate already existing data, resulting in potentially reduced cost and liability to an aircraft manufacturer and associated parties.

Technical problems addressed by systems and methods taught herein include comparing large and dissimilar data stores containing data about the same, similar, or unlike products and resolving discrepancies. As noted, product design, engineering, and manufacturing functions of a manufacturer may maintain separate data stores. Such separate data stores may have different structures and naming conventions.

Other technical problems addressed include difficulties associated with ferreting out matches and differences in very complex data set 116, data set 118, and data set 120. Such technical problems are solved in part by evaluating effectivities contained within complicated disparate data tables across an enterprise and multiple configurations.

Systems and methods taught herein provide technical solutions to technical problems. Technical problems include an aircraft manufacturer needing to consistently track many changes in configuration of an aircraft across the stages of initial purchaser negotiations to engineering and through manufacturing wherein many internal manufacturer functions are involved as well as external suppliers and wherein errors not found prior to manufacturing may be very costly. Technical problems also include airlines being tasked with maintaining detailed records of an aircraft's configuration across the aircraft's lifetime and coordinating with the manufacturer that may also want to maintain such records during the aircraft's lifetime. Technical problems also include configuration information for an aircraft prior to and after manufacturing being stored in many different data stores by different constituents such as manufacturer, subcontractors, service providers, insurers, aircraft owner, and regulators and the need to maintain consistency across those data stores for many years in some cases, even after an aircraft has been permanently removed from service.

Technical solutions include physical results of shorter cycle of design to engineering to manufacturing due to fewer errors and resolution of errors prior to commencement of manufacturing. Technical solutions also include greater consistency across data stores which may be both vast and disparate in terms of structure and location. Physical results of the technical solutions also include lower costs incurred by manufacturer, suppliers, and purchasing airline due to the reduced errors with consequent improved profitability. Cost savings also result from not having to perform one to one comparisons of tail numbers of aircraft. Further, by overcoming structural differences between data stores of various parties, systems and methods provided herein also yield a physical result of reduced cost by promoting resolution of errors and reduced management burden. Further, by promoting traceability of design representation from initial design to the end of an aircraft's life and beyond among constituents, physical results of technical solutions include tighter compliance with regulation, reduced liability and more safety for passengers and others.

Closeness of matches may be determined during selection of pairs of columns from data set 116 and data set 118 for which it may be known that their data may match. For each pair of columns the data from one data set 116 may be compared against the data from the other data set 118. When the data for each column pair is identical, the rows are a perfect match. In other cases proprietary algorithms are used to determine how similar the values in the two columns may be. These algorithms depend on the nature of the data in the columns and result in a value between 0% (completely different) and 100% (identical). The ratings thus obtained for each column pair are then combined into an overall rating using a weighted average.

Figure 3:
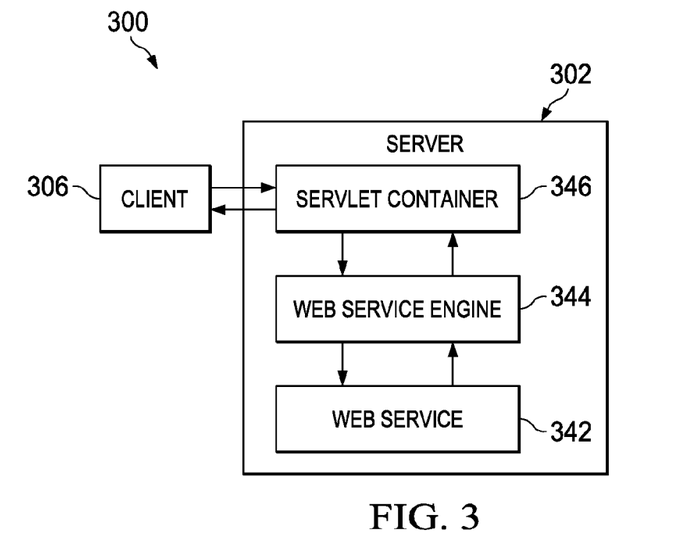
FIG. 3 a block diagram of a system of correlation of maximum configuration data sets in accordance with an illustrative embodiment.

FIG. 3 a block diagram of a system of correlation of maximum configuration data sets in accordance with an illustrative embodiment. System 300 includes server 302. Components depicted in FIG. 3 may align with components depicted in FIG. 1 and provided by system 100. Server 302 depicted in FIG. 3 corresponds to computer 102 provided by system 100. Client 306 corresponds to client device 106 provided by system 100. Web service 342, web service engine 344, and servlet container 346 may collectively correspond to some aspects of application 104 provided by system 100. Reference numerals common to FIG. 1 may be as described above.

Application 104 may be provided as a web service. Web service 342 may handle basic matching functionality between data set 116, data set 118, and data set 120. Web service 342 may be a software system designed to support interoperable machine-to-machine interaction over a network. Web service 342 has an interface described in a machine-processable format.

Web service engine 344 may handle parsing of requests and assembly of responses. Communication by web service engine 344 may take place using messages exchanged using service orientated access protocol (SOAP). Web service engine 344 may use Axis2 core engine for web services provided by Apache Software Foundation.

Servlet container 346 handles requests received from client 306 and returns responses to client 306. Servlet container 346 may transmit and receive messages using a variety of protocols including the hypertext transfer protocol (HTTP). Client 306 may transmit and receive messages with servlet container through the use of client software (not depicted in FIG. 3) executing on client 306 that may be web browser software. System 100 provides client component 140 executing on client device 106 that may correspond to such client software executing on client 306. Servlet container 346 may be implemented using Tomcat, an open source web server and servlet container software package provided developed by the Apache Software Foundation.

Figure 4:
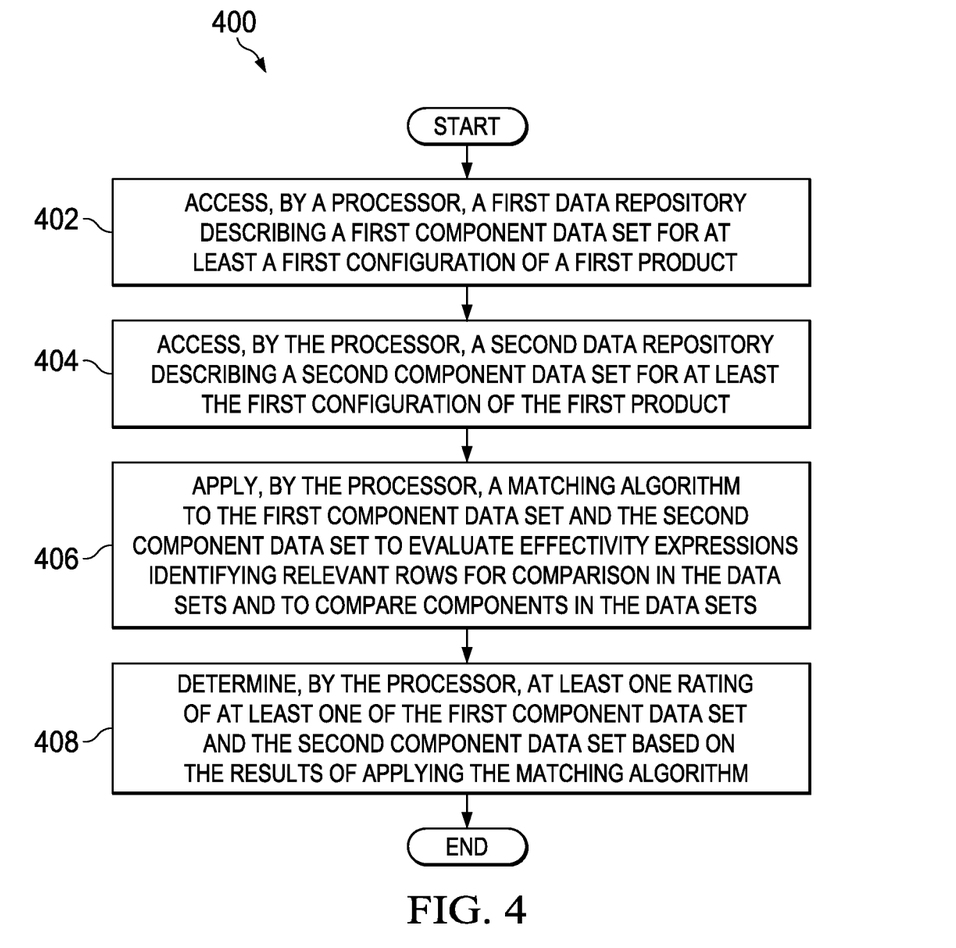
FIG. 4 is a flowchart of a method of correlation of maximum configuration data sets in accordance with an illustrative embodiment.

FIG. 4 is a flowchart of a method of correlation of maximum configuration data sets in accordance with an illustrative embodiment. Method 400 shown in FIG. 4 may be implemented using system 100 of FIG. 1. The process shown in FIG. 4 may be implemented by a processor, such as processor unit 504 of FIG. 5. The process shown in FIG. 4 may be a variation of the processes shown in FIG. 1 and FIG. 3 through FIG. 5. Although the operations presented in FIG. 4 are described as being performed by a "process," the operations are being performed by at least one tangible processor or using one or more physical devices, as described elsewhere herein. The term "process" also may include computer instructions stored on a non-transitory computer readable storage medium.

Method 400 may begin as the process may access, by a processor, a first data repository describing a first component data set for at least a first configuration of a first product (operation 402). Next, the process may access, by the processor, a second data repository describing a second component data set for at least the first configuration of the first product (operation 404). Next, the process may apply, by the processor, a matching algorithm to the first component data set and the second component data set to evaluate effectivity expressions identifying relevant rows for comparison in the data sets and to compare components in the data sets (operation 406). Next, the process may determine, by the processor, at least one rating of at least one of the first component data set and the second component data set based on the results of applying the matching algorithm (operation 408). Method 400 may terminate thereafter.

Figure 5:
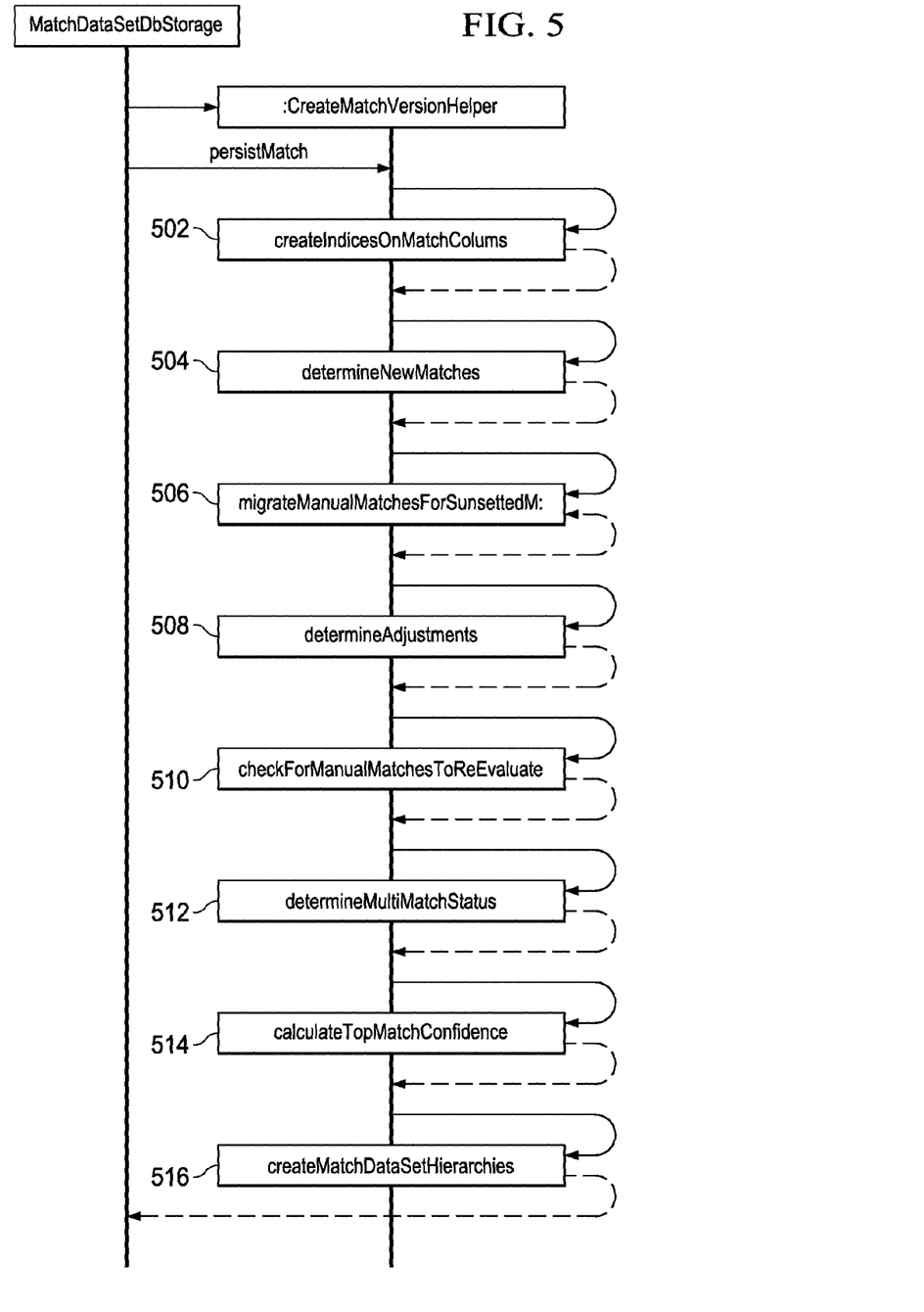
FIG. 5 is a diagram of steps for creating or updating a comparison of data sets.

FIG. 5 is a diagram of steps for creating or updating a comparison of data sets. An SQL JOIN action may be performed on columns specified in criterion for left and right data set 116 and data set 118, respectively. Systems and methods taught herein may retrieve data for columns specified in the "others" criteria in a match specification. A match algorithm specified in criteria may be used to compare columns. FIG. 5 depicts steps for creating or updating a comparison of data set 116, data set 118, and data set 120. Steps 500 in FIG. 5 include createIndicesOnMatchColums 502, determineNewMatches 504, migrateManualMatchesForSunsettedM: 506, and determineAdjustments 508. Further, steps 500 also include checkForManualMatchesToReEvaluate 510, determineMultiMatchStatus 612, calculateTopMatchConfidence 514, and createMatchDataSetHierarchies 516. The process may terminate thereafter.

Physical manifestation and results of application of the systems and methods provided herein include shorter cycle of design to engineering to manufacturing. The shorter cycle may arise from fewer overall errors and consequent resolution of errors prior to commencement of manufacturing. Physical results also include greater consistency across data stores of the various constituents which reduce costs and liability during the lifetime of an aircraft.

Figure 6:
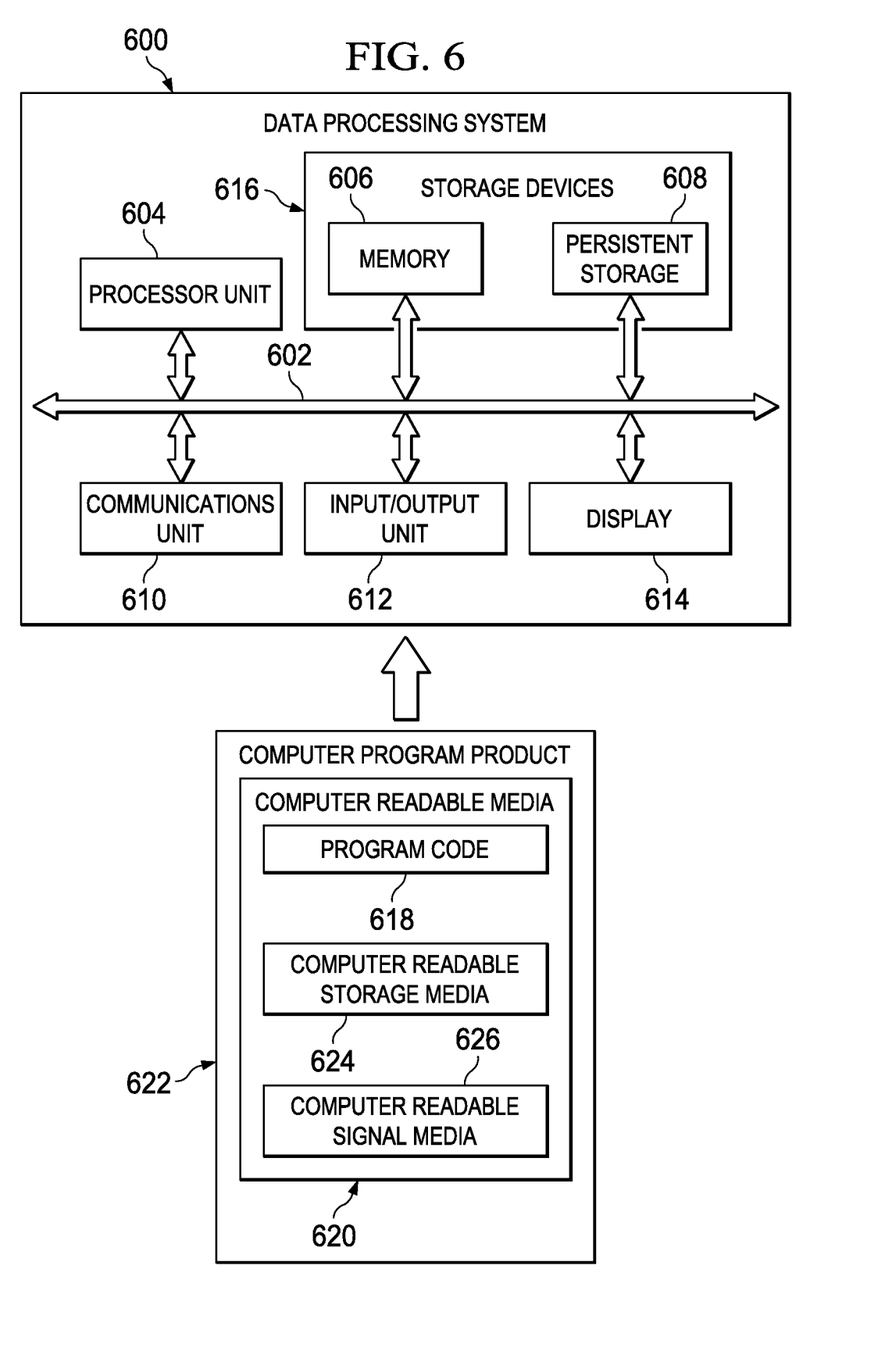
FIG. 6 is an illustration of a data processing system, in accordance with an illustrative embodiment.

FIG. 6 is an illustration of a data processing system, in accordance with an illustrative embodiment. Data processing system 600 in FIG. 6 is an example of a data processing system that may be used to implement the illustrative embodiments, such as system 100 of FIG. 1, or any other module or system or process disclosed herein. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

Data processing system 600 may also include associative memory 628. Associative memory 628 may be in communication with communications fabric 602. Associative memory 628 may also be in communication with, or in some illustrative embodiments, be considered part of storage devices 616. While one associative memory 628 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters. The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of correlating data for multiple product configurations of a subject aircraft, comprising:
    enhancing, by a processor, a data set definition to accommodate data models of pre-existing data sets, at least two of the data models differing in size, quantity and structure from each other, wherein each data set describes a corresponding different product configuration of the subject aircraft relative to other ones of the pre-existing data sets, and wherein enhancing the data set definition is performed by adding, by the processor, effectivity expressions to each of the pre-existing data sets, the effectivity expressions containing markers associated with characteristics of the subject aircraft, and the effectivity expressions configured to be evaluated using Boolean logic;
    determining, by the processor, which rows in each of the pre-existing data sets are relevant to a given aspect of the subject aircraft, wherein determining is performed by applying Boolean logic to the effectivity expressions in all of the pre-existing data sets, and wherein a result of determining is a set of rows, the set of rows being from multiple ones of the pre-existing data sets, the set of rows further being less than all rows of all the pre-existing data sets, and at least some rows of the set of rows having differing structures because the at least some of the rows are structured using different data models from the data models; and
    enhancing, by the processor, at least one matching algorithm to be used to compare the set of rows by adding functionality to the algorithm until the at least one matching algorithm is capable of comparing the at least some of the rows having the differing structures.

2. The method of claim 1, wherein enhancing the data set definition further comprises importing additional descriptors of data objects and providing additional features to the data models.

3. The method of claim 1, wherein enhancing the at least one matching algorithm further comprises enabling matching of different representations of data and adding functionality that promotes comparisons of data sets of unlike structure.

4. The method of claim 1, wherein the at least one matching algorithm enables simultaneous validation of engineering data for multiple product configurations.

5. The method of claim 4, wherein a maximum configuration data set contains configuration data for all product configurations subject to comparison by the at least one algorithm.

6. The method of claim 4, wherein the at least one matching algorithm evaluates the effectivity expressions identifying rows in the maximum configuration data set that are relevant to rows in data sets of product configurations subject to comparison.

7. The method of claim 1, wherein the at least one matching algorithm compares values of product configurations for multiple units of a multiple models of a product.

8. The method of claim 1 further comprising:
    receiving a request for data; and
    comparing only the set of rows when searching for a result of the request; and
    returning the result.

9. The method of claim 8 wherein the effectivity expressions are created for an individual tail number of the subject aircraft.

10. A system for correlating data for multiple product configurations, comprising:
    a processor;
    a memory connected to the processor, the memory storing program code which, when executed by the processor, performs a computer-implemented method, the program code comprising:
    program code for enhancing, by a processor, a data set definition to accommodate data models of pre-existing data sets, at least two of the data models differing in size, quantity and structure from each other, wherein each data set describes a corresponding different product configuration of the subject aircraft relative to other ones of the pre-existing data sets, and wherein enhancing the data set definition is performed by adding, by the processor, effectivity expressions to each of the pre-existing data sets, the effectivity expressions containing markers associated with characteristics of the subject aircraft, and the effectivity expressions configured to be evaluated using Boolean logic;
    program code for determining, by the processor, which rows in each of the pre-existing data sets are relevant to a given aspect of the subject aircraft, wherein determining is performed by applying Boolean logic to the effectivity expressions in all of the pre-existing data sets, and wherein a result of determining is a set of rows, the set of rows being from multiple ones of the pre-existing data sets, the set of rows further being less than all rows of all the pre-existing data sets, and at least some rows of the set of rows having differing structures because the at least some of the rows are structured using different data models from the data models; and
    program code for enhancing, by the processor, at least one matching algorithm to be used to compare the set of rows by adding functionality to the algorithm until the at least one matching algorithm is capable of comparing the at least some of the rows having the differing structures.

11. The system of claim 10, wherein an application identifies discrepancies between the data models and between the data sets and wherein opportunities for improvements in at least one of process, sequence, and testing of the subject aircraft are derived from analysis of the discrepancies.

12. The system of claim 11, wherein the discrepancies result from at least one of differences in engineering specifications of the subject aircraft associated with the product configurations and errors in product specifications of the subject aircraft comprising at least one of omissions, duplications, and typographical errors.

13. The system of claim 10, wherein the application may be executed prior to final approval and release of design requirements and is directed to reducing at least one of specification derivation and design optimization expense.

14. The system of claim 10, wherein the application is executed prior to manufacturing and is directed to reducing manufacturing time and expense.

15. The system of claim 10, wherein the application is executed after manufacturing and is directed to regulatory guidelines regarding at least record keeping and safety compliance.

16. A method of correlation of configuration data sets, comprising:
- accessing, by a processor, a first data repository describing a first pre-existing component data set for at least a first configuration of a first product;
- accessing, by the processor, a second data repository describing a second pre-existing component data set for at least the first configuration of the first product, wherein the first data repository has a first structure different than a second structure of the second data repository, wherein the first pre-existing component data set has the first structure, and wherein the second pre-existing component data set has the second structure;
- enhancing both the first pre-existing component data set and the second pre-existing component data set by adding effectivity expressions to the first pre-existing component data set and the second pre-existing component data set, the effectivity expressions containing markers associated with characteristics of the first product, and the effectivity expressions configured to be evaluated using Boolean logic;
- determining, by the processor, which rows in each of the first pre-existing component data set and the second pre-existing component data set are relevant to a given aspect of the first product, wherein determining is performed by applying Boolean logic to the effectivity expressions in all of the data sets, and wherein a result of determining is a set of rows, the set of rows being from multiple ones of the first pre-existing component data set and the second pre-existing component data set, the set of rows further being less than all rows of all the first pre-existing component data set and the second pre-existing component data set, and at least some rows of the set of rows having differing structures;
- enhancing, by the processor, a matching algorithm to be used to compare the set of rows by adding functionality to the algorithm until the matching algorithm is capable of comparing the at least some of the rows having the differing structures, wherein an enhanced matching algorithm is formed;
- determining, by the processor, at least one rating of at least one of the first component data set and the second component data set using the enhanced matching algorithm.

17. The method of claim 16, wherein the at least one rating indicates ratings of how selected rows contained in the first component data set compare with selected rows contained in the second component data set.

18. The method of claim 17, wherein a low rating indicates a presence of discrepancies at least one of between and within the selected rows of the first component data set and the selected rows of the second component data set.

19. The method of claim 18, wherein the matching algorithm is applied to a first maximum configuration data set describing all possible configurations of the first product.

20. The method of claim 19, wherein the matching algorithm is applied to selected rows of the first maximum configuration data set and selected rows of a second maximum configuration data set describing all possible configurations of a second product.

* * * * *